United States Patent
Chrysanthis

[11] Patent Number: 5,749,168
[45] Date of Patent: May 12, 1998

[54] FLY AND INSECT TRAP

[76] Inventor: Chris A. Chrysanthis, 158 Westdale Ave., Daly City, Calif. 94015

[21] Appl. No.: 729,249
[22] Filed: Oct. 10, 1996
[51] Int. Cl.[6] ............................................. A01M 1/20
[52] U.S. Cl. .......................... 43/122; 43/114; 43/131
[58] Field of Search ........................... 43/107, 114, 115, 43/122, 131, 132.1, 136

[56] References Cited

U.S. PATENT DOCUMENTS

| | | | |
|---|---|---|---|
| 983,977 | 2/1911 | Lilge | 43/122 |
| 1,297,894 | 3/1919 | Navrot | 43/122 |
| 1,360,127 | 11/1920 | McKay | 43/122 |
| 1,902,723 | 3/1933 | Roberts | 43/131 |
| 1,916,982 | 7/1933 | Jones | 43/131 |
| 4,244,135 | 1/1981 | Harwoods | 43/122 |
| 4,310,985 | 1/1982 | Foster et al. | 43/131 |
| 4,662,103 | 5/1987 | Cheng | 43/131 |
| 4,802,303 | 2/1989 | Floyd, III | 43/114 |
| 4,986,024 | 1/1991 | Peek et al. | 43/122 |
| 5,406,743 | 4/1995 | McSherry et al. | 43/122 |

*Primary Examiner*—Daniel D. Wasil
*Attorney, Agent, or Firm*—Douglas E. White; Acronational Law Firm

[57] ABSTRACT

A fly catcher apparatus has a cylindrical body with a single fly inlet port on its wall, near the bottom thereof. A central tube holds a wick of cloth, sponge or similar liquid-permeable material. Midway up the tube are a series of regularly spaced cloth or sponge-like fly-contacting (and other insect-contacting) members, preferably colored and shaped like leaves. These are attached in fluid communication with the wick and exit out the side of the tube into the interior cavity of the body. At the top of the tube is a cup for holding odoriferous bait, in the form of decaying meat, fish or the like. One or more aroma ports allow the smell of the bait to exit out the removable cap of the cup. Additional perforations for releasing the aroma of bait decay are located on the side wall of the bait cup. The top of the wick forms one or more bait-moistening members which exit out the top or side of the tube into the cup. Moisture carried up the wick keeps the bait moist. The device uses an aqueous trapping solution preferably comprising about three parts water to about one part household glue.

18 Claims, 3 Drawing Sheets

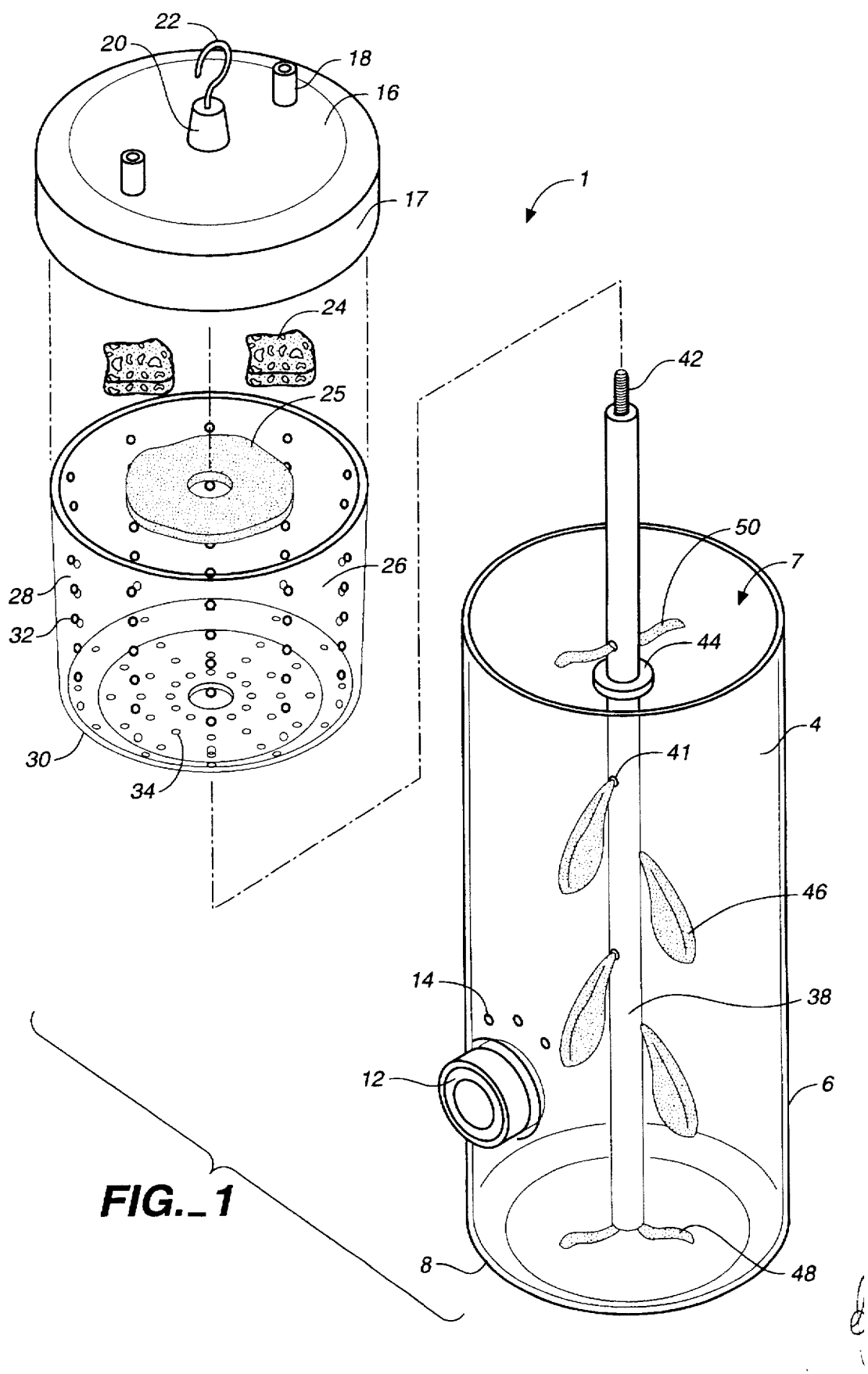
FIG._1

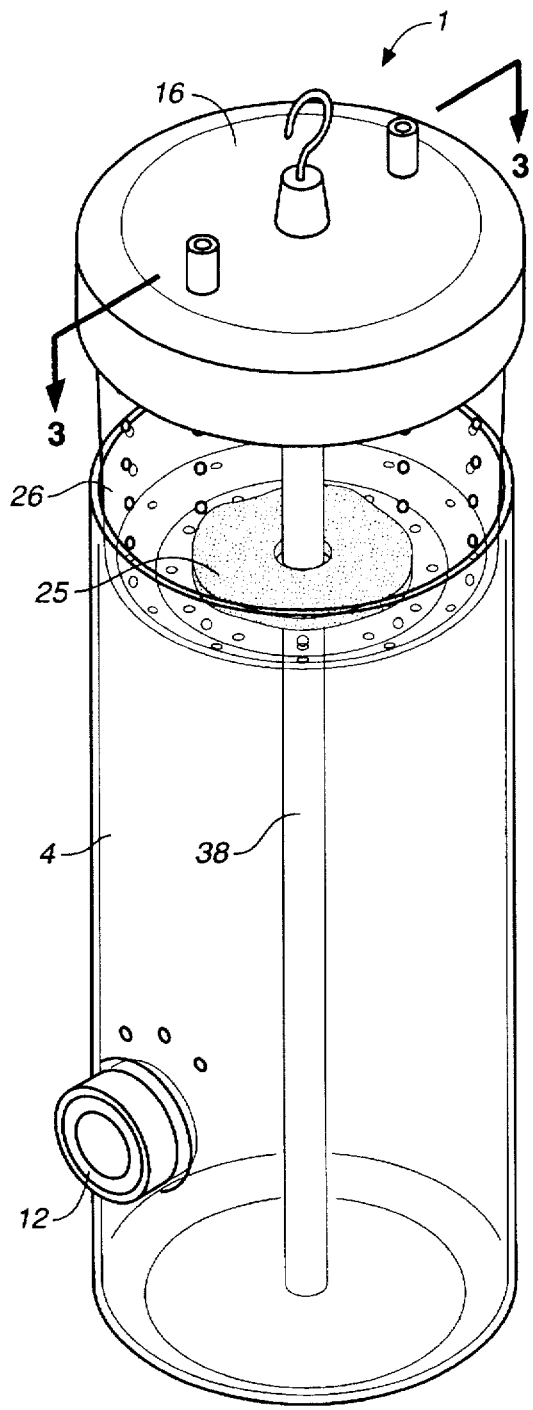
FIG._2
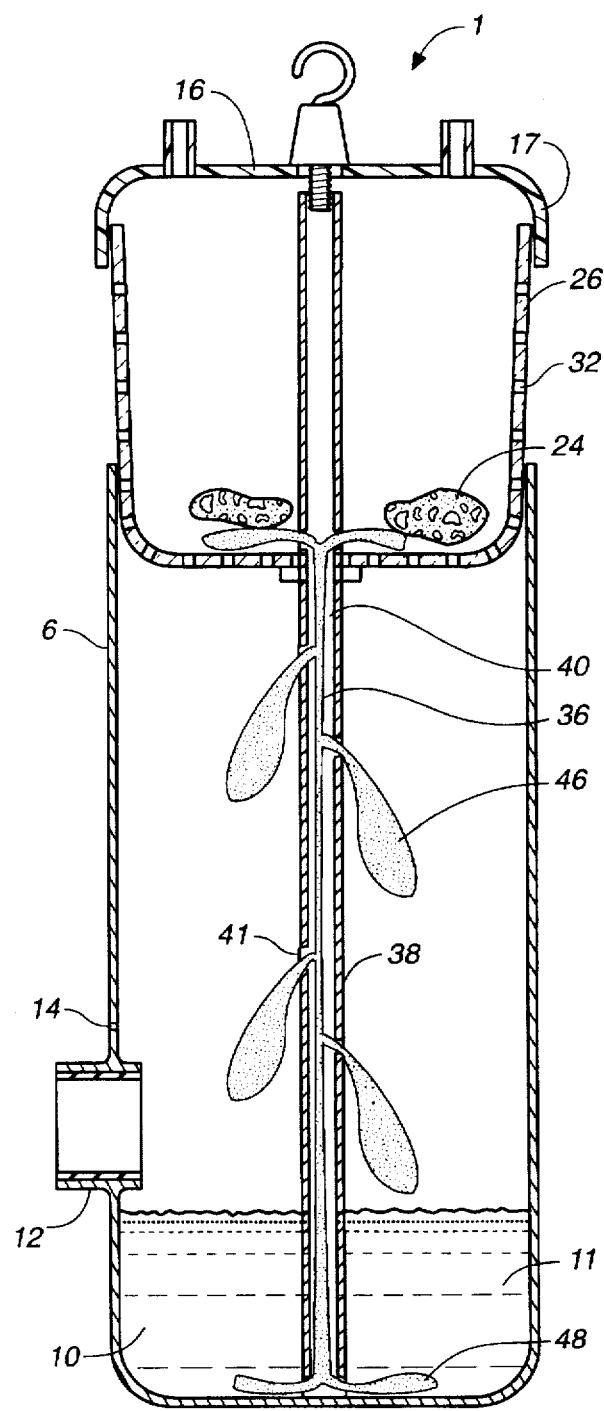
FIG._3

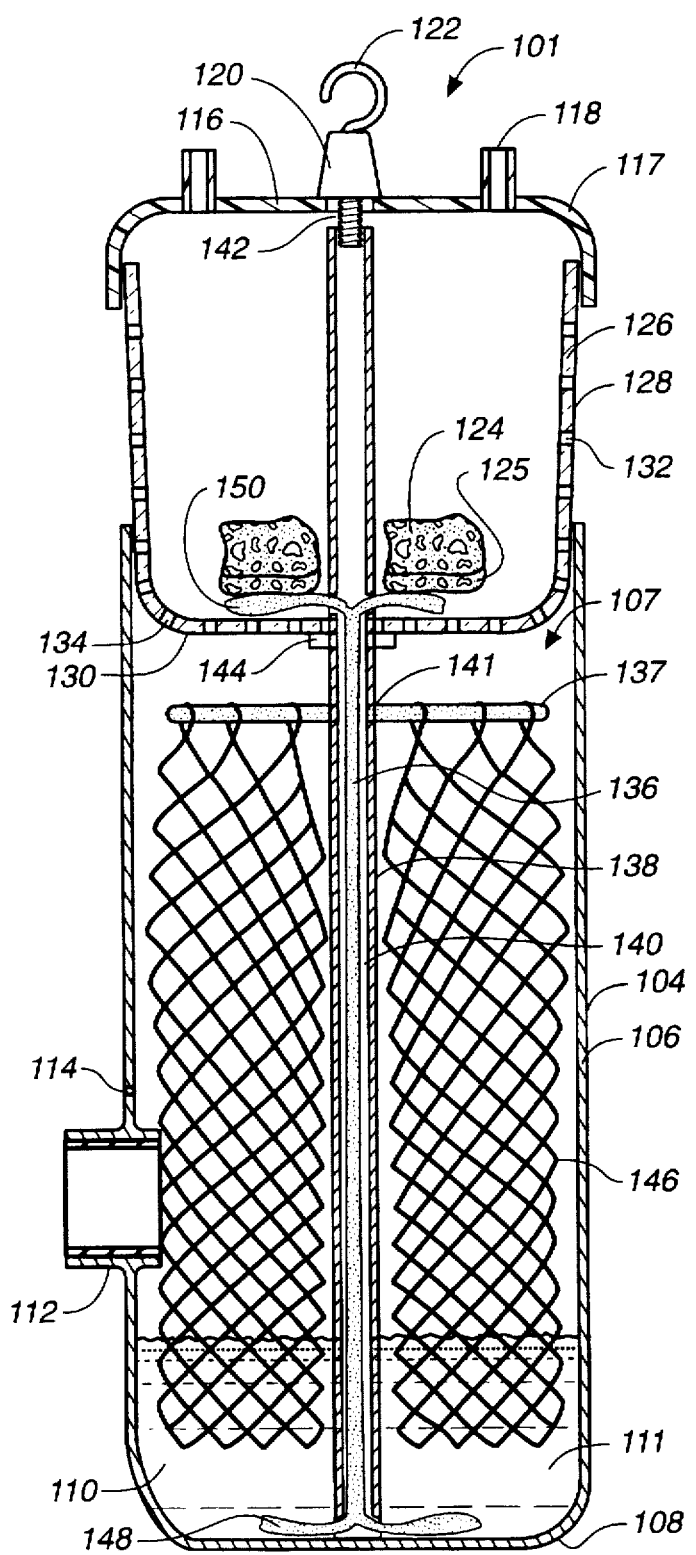
FIG._4

FLY AND INSECT TRAP

FIELD OF THE INVENTION

This invention relates to insect traps, and more particularly to a trap for flies and similar winged insects which kills by depositing glue on the insects so that they may no longer fly.

BACKGROUND OF THE INVENTION

Flies, mosquitoes and similar flying insects are an age old nuisance. Numerous devices have been proposed with which to catch and kill flies, with varying degrees of efficacy. Furthermore, modern devices typically rely on harsh poisons—often, the more effective the device, the stronger the poison it uses. Poisons, however, themselves cause recognized problems. Insect poisons can be hazardous to humans, animals, and even plants, both in the use and the later disposal thereof. Such concerns are particularly acute in domestic environments, where poison hazards in fly traps may extend to children and pets—both of which are more susceptible to acute poisoning and long-term toxic tissue accumulations than are adult humans.

While devices have been proposed within which to trap flies and the like by drowning them in water, such devices have not been particularly effective—principally because of the difficulty in forcing the flies into the water. Merely exhausting the entrapped flies until they fall into water takes a long time, during which many succeed in finding their way back out of the trap.

There is a need, therefore, for a fly and insect trap which is both effective and non-toxic to humans and to animals, and to the environment in general.

Prior developments in this field may be generally illustrated by reference to the following information disclosure statement:

| U.S. Pat. No. | Patentee | Issue Date |
|---|---|---|
| 4,802,303 | J. Floyd III | Feb. 07, 1989 |
| 4,986,024 | T. Peek et al. | Jan. 22, 1991 |
| 4,244,135 | H. Harwoods | Jan. 13, 1981 |
| 1,297,894 | S. Navrot | Mar. 18, 1919 |
| 983,977 | A. Lilge | Feb. 14, 1911 |
| 1,360,127 | T. McKay | Nov. 23, 1920 |
| 4,662,103 | L. Cheng | May 5, 1987 |
| 5,406,743 | B. McSherry et al. | Apr. 18, 1995 |

U.S. Pat. No. 4,802,303 teaches a fly trap that uses a wick-fed liquid chemical attractant to draw the flies. The flies land on a non-wicked surface coated with a solid comprised of sugar and the poison DDYP—which causes them to die.

U.S. Pat. No. 4,986,024 teaches a insect trap used to attract flies by luring them with non-wicked chemical attractant. The flies land on a surface coated with the same solid poison.

U.S. Pat. Nos. 1,297,894, 983,977 and 1,360,127 teach fly traps which provide a food lure that causes them to become entrapped in the interior of the devices. They eventually die by drowning in a poisonous liquid or in water.

The rest of the patents are representative of what is to be found in the art.

SUMMARY OF THE INVENTION

The present invention is a fly catcher apparatus having a cylindrical body with a single fly inlet port on its wall, near the bottom thereof A central tube holds a wick of cloth or similar liquid-permeable material. Midway up the tube are a series of regularly spaced cloth fly-contacting (and other insect-contacting) members, preferably colored and shaped like leaves. These are attached in fluid communication with the wick and exit out the side of the tube into the interior cavity of the body.

At the top of the tube is a cup for holding odoriferous bait, in the form of decaying meat, fish or the like. One or more aroma ports allow the smell of the bait to exit out the removable cap of the cup. Additional perforations for the outlet of the aroma of bait decay are located on the side wall of the bait cup. The top of the wick forms one or more bait-moistening members which exit out the top or side of the tube into the cup. Moisture carried up the wick (see below) keeps the bait moist—which is important for keeping it odoriferous.

The device uses a novel aqueous trapping solution which, while acting as a form of "poison," actually is non-toxic to humans—adult or child. The solution preferably comprises about three parts water to about one part white household glue of the type sold under the trademark ELMER'S, available from Borden Inc. This brand is known to be almost fully non-toxic—even if directly consumed by children. Other non-toxic domestic glues made from processed animal protein or vegetable mucilage are readily available, and may be used in aqueous solution to practice this invention.

Into the cavity of the body is poured the fly-trapping solution, up to a level below the fly inlet port opening. The wick draws the solution up and onto the fly-contacting members, as well as into the bait cup and onto the bait. The wick and the contacting members become saturated with the glue-bearing solution. Neither will dry out for a very long period of time. Specifically to catch mosquitoes, a wick-fed obstacle net may be substituted for the fly-contacting members.

A small amount of air enters the body of the trap, chiefly through the inlet port, and enters the cup via perforations in the bottom of the cup which communicate with the container's inner cavity. From the cup, the air travels up past the bait and out through one or more vapor vents or ports in the cap of the cup. This releases the odor of decay into the air, attracting flies and other flying insects. Additional small perforations may be formed in the side of the container near the fly inlet port so that odor can travel down and out the inlet port and the nearby perforations. This attracts the flies directly to the inlet port, which they then use to fly into the container. Preferably, only one fly inlet port is provided—to minimize the number of flies which accidentally find their way back out of the device.

Once in the container, the flies cannot reach the bait. However, they fly around looking for the bait, or for an exit, until they become tired. They inevitably land on one of the leaf-like wicked contacting members. This immediately causes them to pick up small amounts of glue on their footpads, tongue, antennae and the like. In an attempt to rid themselves of the glue, they groom the affected parts. This merely spreads the glue to other body parts—in particular, to their wings. Once their wings have glue on them, the insects no longer can fly. They drop down into the solution and drown.

After a sufficient quantity have been captured, the cap and cup can be removed, the dead flies and other insects disposed of, and the bait and solution replaced for reuse of the device.

Features and Advantages

An object of this invention is to disclose a fly and insect trap apparatus including a body forming an interior cavity;

an inlet port for admitting flying insects; means for externally venting bait aroma; a reservoir for holding an aqueous solution of glue; a wick vertically supported in the body and extending down into the reservoir; and at least one insect-contacting member connected in fluid communication with the wick.

A further object or feature is a solution of water and glue in the reservoir, wherein the wick draws glue up and onto the contacting member.

Another feature is that the aroma venting means includes a cup attached to the body. Outlet perforations in the cup communicate externally of the apparatus.

Still other features are a tube having a hollow axial core; an open bottom end of the tube; and at least one side tube aperture in the tube, each aperture communicating with the core, wherein the wick is disposed in the core and exits the open bottom tube end, and the contacting member is threaded out one of the tube apertures.

Yet another feature is at least one bait-moistening member connected in fluid communication with the wick, the bait-moistening member threaded out a tube aperture into the cup.

Another feature is a bait-moistening disk laid in fluid communication upon the bait-moistening member.

One more feature is an annular flange on the tube, the flange supporting the cup above the body.

Yet other features are a bolt in an upper end of the tube and a nut—the nut holding the cup onto the bolt.

As another feature, the trap may include air inlets in the body of the apparatus communicating externally of the body, and inlet perforations in the cup communicating between the cup and the interior cavity.

Other features include at least one wick-moistening member exiting the open bottom tube end; a plurality of contacting members exiting out a plurality of tube apertures, wherein the contacting members are shaped like leaves; a cap on the cup; a pair of aroma ports on the cap; and a hook mounted above the cap for hanging the apparatus.

Another feature is an apparatus that is easy to use, attractive in appearance and suitable for mass production at relatively low cost.

Other novel features which are characteristic of the invention, as to organization and method of operation, together with further objects and advantages thereof will be better understood from the following description considered in connection with the accompanying drawing, in which a preferred embodiment of the invention is illustrated by way of example. It is to be expressly understood, however, that the drawing is for illustration and description only and is not intended as a definition of the limits of the invention.

Certain terminology and derivations thereof may be used in the following description for convenience in reference only, and will not be limiting. For example, words such as "upwardly," "downwardly," "leftward," and "rightward" would refer to directions in the drawings to which reference is made unless otherwise stated. Similarly, words such as "inwardly" and "outwardly" would refer to directions toward and away from, respectively, the geometric center of a device or area and designated parts thereof References in the singular tense include the plural, and vice versa, unless otherwise noted.

BRIEF DESCRIPTION OF THE DRAWING

FIG. 1 is a partially exploded perspective view of a preferred fly trap of this invention;

FIG. 2 is an assembled perspective view of the trap of FIG. 1;

FIG. 3 is a sectional frontal elevation of the trap of FIG. 1, taken along line 3—3 of FIG. 2; and FIG. 4 is a sectional frontal elevation of a preferred mosquito trap of this invention.

Drawing Reference Numerals 1 fly and insect trap
4 body
6 wall
7 interior cavity
8 bottom
10 reservoir
11 trapping solution
12 inlet port
14 air inlet
16 cap
17 rim
18 aroma port
20 nut
22 hook
24 bait
25 bait-moistening disk
26 cup
28 side wall
30 bottom
32 outlet perforation
34 inlet perforation
36 wick
38 tube
40 core
41 aperture
42 bolt
44 flange
46 fly-contacting member
48 wick-moistening member
50 bait-moistening member
101 fly and insect trap
104 body
106 wall
107 interior cavity
108 bottom
110 reservoir
111 trapping solution
112 inlet port
114 air inlet
116 cap
117 rim
118 aroma port
120 nut
122 hook
124 bait
125 bait-moistening disk
126 cup
128 side wall
130 bottom
132 outlet perforation 134 inlet perforation
136 wick
137 net support arm
138 tube
140 core
141 aperture
142 bolt
144 flange
146 obstacle net
148 wick-moistening member
150 bait-moistening member It is to be noted that, for convenience, the last two positions of the reference numerals of the alternative embodiment of the invention duplicate those of the numerals of the embodiment of FIG. 1. where reference is made to similar or corresponding parts. However, it should not be concluded merely from this numbering convention that similarly numbered parts are equivalents.

DESCRIPTION OF A PREFERRED EMBODIMENT

Referring generally to FIGS. 1-3, there is illustrated therein a first preferred fly and insect trap 1 of this invention.

The trap 1 has a generally cylindrical body 4 with a wall 6, the body being closed below with a flat bottom 8 and being open on its top. The bottom 8 and wall 6 together form a hollow cylindrical interior cavity 7. The body 4 preferably is made of transparent plastic. It could, however, be made of glass or metal, or be wholly or partially colored or opaque.

An inlet port 12 communicates with the interior cavity 7 and provides ready ingress to flying insects, such as flies, mosquitoes and the like. The fly and insect trap 1 shown in FIGS. 1-3 is particularly adapted to capture and kill flies, such as house flies, horse flies, lake flies, and the like. Preferably, the inlet port 12 leads directly into the interior cavity 7. However, suitable barriers intended to thwart quick egress, as are common in the art, could be incorporated into the design of the inlet port.

Below the inlet port 12, the wall 6 and bottom 8 of the body 4 form a cup-like reservoir 10 into which a substantial quantity of liquid trapping solution 11 may be poured. The trapping solution typically comprises about three parts water to about one part non-toxic household glue, preferably white glue of the type sold under the trademark ELMER'S. Other non-toxic domestic glues made from processed animal protein or vegetable mucilage may be used in the trapping solution 11.

Above the inlet port 12, and in other suitable locations (not illustrated) are air inlets 14 for admitting and/or releasing a flow of air into the device, thereby augmenting substantial air flow through the inlet port 12.

Attachable to the body 4 is a bait cup 26 having a removable cap 16 affixed by means of its annular rim 17 to a generally cylindrical side wall 28 of the cup. The flat bottom 30 of the cup 26 is permeated with a large plurality of air inlet perforations 34, which perforations allow air entering the interior cavity 7 of the body 4 to flow upward into the cup 26. Similar outlet perforations 32 in the cup side wall 28 allow air entering the cup to exit therefrom. Air also can exit via one or more aroma ports 18 in the cap 16.

The cap 16 is provided with a hook 22 for hanging the device from a tree limb or the like.

Turning back to the interior cavity 7 of the body 4 of the fly and insect trap 1, coaxially disposed vertically therein is an elongated straw-like tube 38 having a hollow core 40. Threaded within the core 40 is a fluidpermeable wick 36. Integrally connected in fluid communication with the wick 36 are a plurality of regularly spaced fly-contacting members 46, each of which exits the core 40 via apertures 41 in the tube 38 and fans out within the interior cavity 7. Preferably, the contacting members are made from the same cloth or sponge-like material as the wick.

The bottom of the wick 36 spreads out into one or more wick-moistening members 48 that exit the bottom of the core 40 in fluid communication with the trapping solution 11 that is held in the reservoir 10.

A finger-twist nut 20 affixes to a bolt 42 in the top of the tube 38 and holds the cup 26 and the cap 16 securely in place atop the body 4. The tube 38 threads through the cup bottom 30, which bottom 30 rests against an annular flange 44 affixed to the tube 38.

One or more bait-moistening members 50 exit through side apertures 41 in the tube 38 and lie down flat against the upper surface of the cup bottom 30. Optionally (FIGS. 1-2), an annular bait-moistening disk 25 may be rested upon the bait-moistening members 50. Suitable bait 24, such as meat, cheese, or similar animal or vegetable products subject to odoriferous decay, is placed on top of the bait-moistening disk 25 and/or the bait-moistening members 50.

In FIG. 2, the wick 36, fly-contacting members 46, wick-moistening members 48, and bait 24 are omitted for clarity of illustration. In FIG. 3, the bait-moistening disk 25 is omitted because certain types of bait 24 may be kept adequately moist without one, through direct contact with the bait-moistening members 50.

Referring to FIG. 4, there is illustrated therein a second embodiment of this invention, namely, mosquito trap 101.

The trap 101 has a body 104 with a wall 106, the body being closed below with a flat bottom 108 and open on its top. The bottom 108 and wall 106 together form a hollow cylindrical interior cavity 107.

An inlet port 112 communicates with the interior cavity 107 and provides ready ingress to flying insects. The trap 101 shown in FIGS. 1-3 is particularly adapted to capture and kill mosquitoes.

Below the inlet port 112, the wall 106 and bottom 108 of the body 104 form a reservoir 110 into which a substantial quantity of glue and water trapping solution 111 may be poured.

Above the inlet port 112 are air inlets 114 for admitting and/or releasing a flow of air into the device, thereby augmenting substantial air flow through the inlet port 112.

Attachable to the body 104 is a bait cup 126 having a removable cap 116 affixed by means of its rim 117 to a generally cylindrical side wall 128. The flat bottom 130 of the cup 126 is permeated with a large plurality of air inlet perforations 134, which perforations allow air entering the interior cavity 107 of the body 104 to flow upward into the cup 126. Similar outlet perforations 132 in the cup side wall 128 allow air entering the cup to exit therefrom. Air also can exit via one or more aroma ports 118 in the cap 116. The cap 116 is provided with a hook 122 for hanging the device.

Coaxially disposed vertically in the interior cavity 107 is an elongated tube 138 having a hollow core 140. Threaded within the core 140 is a fluid permeable wick 136. Integrally connected in fluid communication with the wick 136 is an obstacle net 146 having mesh openings about ¾ to one inch wide (just large enough for a mosquito to fly through). The obstacle net 146 hangs from a pair of rigid, but fluid permeable, net support arms 137, each of which arms exits the core 140 via apertures 141 in the tube 138 in direct fluid communication with the wick.

The bottom of the wick 136 spreads out into one or more wick-moistening members 148 that exit the bottom of the core 140 in fluid communication with the trapping solution 111 held in the reservoir 110.

A finger-twist nut 120 affixes to a bolt 142 in the top of the tube 138 and holds the cup 126 and the cap 116 securely in place atop the body 104. The tube 138 threads through the cup bottom 130, which bottom 130 rests against an annular flange 144 affixed to the tube 138.

One or more bait-moistening members 150 exit through apertures in the tube 138 and lie down flat against the upper surface of the cup bottom 130. An annular bait-moistening disk 125 may be rested above the bait-moistening members 150. Suitable bait 124 is placed on top of the bait-moistening disk 125 and/or the bait-moistening members 150.

Operation

Glue dissolved in the trapping solution 11 rises up the wick 36 and permeates the fly-contacting members 46, which members remain moist and sticky as long as a supply of trapping solution 11 remains in the reservoir 10.

Air entering the interior cavity 7 via the inlet port 12 and air inlets 14 rises up and passes through the cup bottom inlet perforations 34, past the bait 24 (thereby carrying off fly-attracting vapors), and out the outlet perforations 32 in the cup side wall 28 and the aroma ports 18 of the cap 16.. A certain amount of decay vapors also may exit the inlet port 12 and air inlets 14. The outlet perforations 32, aroma ports 18, inlet port 12 and air inlets 14 all therefore comprise means for externally venting bait aroma. The bait 24 is kept moist (thereby promoting continuous decay) by means of fluid rising up the tube 38 and out the bait-moistening members 50.

Flies attracted to the smell of edible bait soon find they cannot get to it through the outlet perforations 32 or the aroma ports 18 of the cap. Inevitably, they enter the inlet port 12 in search of the bait 24. Once in the interior cavity 7, they will fly around therein seeking food, and failing that, safe egress. However, they quickly tire and eventually seek to rest on the fly-contacting members 46, which may be colored and shaped so as to be deceptively attractive to them.

Once on the glue-saturated fly-contacting members 46, a fly or other flying insect picks up small amounts of glue on its footpads, tongue, antennae and the like. In an attempt to rid itself of the glue, it grooms the affected parts. This merely spreads the glue to other body parts—in particular, to its wings. Once the wings have glue on them, the insect no longer can fly. It drops down into the reservoir 10 and drowns in the trapping solution 11.

After a sufficient quantity of insects have been captured, the cap 16 and cup 26 can be removed, the dead flies and other insects disposed of, and the bait 24 and solution 11 replaced for continuous reuse of the device 1.

The operation of the invention has been described with respect to the fly trapping embodiment of FIGS. 1–3. Trapping mosquitoes in the embodiment of FIG. 4 proceeds in an identical fashion, except that mosquitoes do not seek landing areas as often as flies. The obstacle net 146 of the fly and insect trap 101 are provided as mosquito-contacting areas for attaching glue to the wings of mosquitoes even when lightly brushed in flight (as well as occasionally when landed upon).

The above disclosure is sufficient to enable one of ordinary skill in the art to practice the invention, and provides the best mode of practicing the invention presently contemplated by the inventor. While there is provided herein a full and complete disclosure of the preferred embodiments of this invention, various modifications, alternative constructions, and equivalents may be employed without departing from the true spirit and scope of the invention. Such changes might involve alternative materials, components, structural arrangements, sizes, operational features or the like. For example, the cup can be stored entirely within the interior cavity, wherein the walls of the cup would be nested within the wall of the body, and the cap attached to the body wall rather than to the cup. In such case, the wall of the cup would not contain aroma outlet perforations. Therefore, the above description and illustrations should not be construed as limiting the scope of the invention, which is defined by the appended claims.

What is claimed is:

1. Fly and insect trap apparatus including:

a body forming an interior cavity;

an inlet port for admitting flying insects;

means for externally venting bait aroma;

a glue solution reservoir;

a wick vertically supported in the body and extending down into the reservoir;

at least one insect-contacting member connected in fluid communication with the wick;

a tube having a hollow axial core;

an open bottom end of the tube; and at least one side tube aperture in the tube, the aperture communicating with the core, wherein the wick is disposed in the core and exits the open bottom tube end, and the contacting member is threaded out a tube aperture.

2. Fly and insect trap apparatus including:

a body forming an interior cavity;

an inlet port for admitting flying insects;

means for externally venting bait aroma;

a glue solution reservoir;

a wick vertically supported in the body and extending down into the reservoir;

at least one insect-contacting member connected in fluid communication with the wick; and a solution of water and glue in the reservoir, wherein the wick draws glue up and onto the contacting member.

3. The apparatus of claim 1 wherein:

the aroma venting means includes a cup attached to the body; and outlet perforations in the cup communicating externally of the apparatus.

4. Fly and insect trap apparatus including:

a body forming an interior cavity:

an inlet port for admitting flying insects;

means for externally venting bait aroma, the aroma venting means having a cup attached to the body and outlet perforations in the cup communicating externally of the apparatus;

a glue solution reservoir;

a wick vertically supported in the body and extending down into the reservoir;

at least one insect-contacting member connected in fluid communication with the wick;

a tube having a hollow axial core;

an open bottom end of the tube; and at least one side tube aperture in the tube, the aperture communicating with the core, wherein the wick is disposed in the core and exits the open bottom tube end, and the contacting member is threaded out a tube aperture.

5. The apparatus of claim 4 further including:

at least one bait-moistening member connected in fluid communication with the wick, the bait-moistening member threaded out a tube aperture into the cup.

6. The apparatus of claim 5 further including:

a bait-moistening disk laid in fluid communication upon the bait-moistening member.

7. The apparatus of claim 6 further including:

an annular flange on the tube, the flange supporting the cup above the body.

8. The apparatus of claim 7 further including:

a bolt in an upper end of the tube; and a nut, the nut holding the cup onto the bolt.

9. The apparatus of claim 8 further including:

air inlets in the body communicating externally of the apparatus; and inlet perforations in the cup communicating between the cup and the interior cavity.

10. The apparatus of claim 9 further including:

at least one wick-moistening member exiting the open bottom tube end;

a cap on the cup;

a pair of aroma ports on the cap; and a hook mounted above the cap for hanging the apparatus, and wherein there are a plurality of contacting members exiting out a plurality of tube apertures, the contacting members being shaped like leaves.

11. Fly and insect trap apparatus including:

a cylindrical body forming an interior cavity;

an inlet port for admitting flies or mosquitoes;

means for externally venting bait aroma;

a glue solution reservoir;

a tube vertically disposed coaxially in the cylindrical body, the tube having a hollow axial core;

an open bottom end of the tube;

a wick vertically supported in the core and extending down into the reservoir through the bottom tube end;

a plurality of insect-contacting members connected in fluid communication with the wick; and a plurality of side tube apertures in the tube communicating with the core, wherein the contacting members are threaded out tube apertures.

12. The apparatus of claim 11 further including:

a solution of water and glue in the reservoir, wherein the wick draws glue up and onto the contacting members.

13. The apparatus of claim 12 wherein:

the aroma venting means includes a cup attached to the body; and outlet perforations in the cup communicating externally of the apparatus.

14. The apparatus of claim 13 further including:

at least one bait-moistening member connected in fluid communication with the wick, the bait-moistening member threaded out a tube aperture into the cup.

15. The apparatus of claim 14 further including:

a bait-moistening disk laid in fluid communication upon the bait-moistening member.

16. The apparatus of claim 13 wherein:

the solution comprises about three parts water to about one part household glue.

17. The apparatus of claim 16 wherein:

the contacting members are wick extensions colored and shaped like leaves.

18. The apparatus of claim 16 wherein:

the contacting members are a pair of mesh nets hung in fluid communication with the wick.

* * * * *